United States Patent [19]

Ohlsson

[11] Patent Number: 5,048,874
[45] Date of Patent: Sep. 17, 1991

[54] QUICK COUPLING FOR INTERCONNECTION OF TWO HIGH-PRESSURE FLUID CONDUITS

[76] Inventor: Weimar Ohlsson, Solrosvägen 3, S-445 00 Surte, Sweden

[21] Appl. No.: 438,430
[22] PCT Filed: May 21, 1987
[86] PCT No.: PCT/SE87/00255
§ 371 Date: Dec. 6, 1989
§ 102(e) Date: Dec. 6, 1989
[87] PCT Pub. No.: WO88/09459
PCT Pub. Date: Dec. 1, 1988

[30] Foreign Application Priority Data

Nov. 21, 1985 [SE] Sweden ............................ 8505499-7

[51] Int. Cl.⁵ ......................................... F16L 37/084
[52] U.S. Cl. ........................................ 285/307; 285/319
[58] Field of Search ......................... 285/307, 308, 319

[56] References Cited

U.S. PATENT DOCUMENTS 3,773,360  11/1973  Timbus .................. 285/307
4,208,034  6/1980  Ohlsson .................. 285/308 X

FOREIGN PATENT DOCUMENTS 86404  1/1959  Denmark ................ 285/307

2307154  2/1973  Fed. Rep. of Germany .
853549  12/1939  France .
2122057  8/1972  France .

Primary Examiner—Dave W. Arola
Attorney, Agent, or Firm—Ostrolenk, Faber, Gerb & Soffen

[57] ABSTRACT

A quick coupling for liquid-proof interconnection of two high-pressure fluid conduits, and incorporating a sleeve-formed female part and a male part insertable therein, which are lockable relative to each other by means of a resilient locking member and openable by means of an axially movable disengagement member. The locking member is an axially slotted circular ring of spring steel. The ring incorporates a number of resilient tongues projecting from a cylindrical portion under inclination against the inner of the female part, and adapted to cooperate with a locking lip on the male part. The disengagement member is a ring, which is pushable over the collar-provided and portion of the male part, the inner side of the ring facing a reduced portion of the male part and being designed with a resilient collar which engages the tongues to urge the tongues away from the collar, the axial length of which is smaller than the cylindrical portion of the locking member from which the tongues project.

4 Claims, 2 Drawing Sheets

QUICK COUPLING FOR INTERCONNECTION OF TWO HIGH-PRESSURE FLUID CONDUITS

The present invention refers to a quick coupling for liquid-proof interconnection of two high-pressure fluid conduits, and incorporating a sleeve-formed female part and a male part insertable therein, which parts are lockable relative to each other by means of a resilient locking member and are openable by means of an axially movable disengagement member, whereby the locking member against the action of the spring force by actuation of the disengagement member is retractable into a recess in the inner side of the sleeve-shaped female part, and which locking member in swung out position cooperates with a collar on the male part acting as a locking lip, which collar is designed to form the transitory part from a reduced portion along which the disengagement member is displaceable.

BACKGROUND OF THE INVENTION

Quick couplings e.g. for hydraulic conduits, which operate under very high pressures, are earlier known e.g. from SE-C-406.364 and SE-C-410.508. In these designs the male part at one of its free ends is provided with axial slots, which subdivide the end portion into a number of resilient tongues provided with a radial shoulder, which in the interconnected position of the coupling parts cooperates with an annular stop in the female part. At disengagement the male part is pushed axially into the female part, whereby is obtained an interconnection with an axially movable disengagement member and a simultaneous compression of the tongues, thus that the radial shoulder of the tongues may pass the annular stop of the female part and allow the parts to be pulled apart.

It is a drawback at these known quick couplings, that it is not possible to know with absolute certainty that the radial shoulder of the tongues has really caught behind the annular stop.

The reason for this uncertainty is that the disengagement member at the interconnection of the two parts may be situated in such a position, that the resilient tongues slide into the disengagement member and is radially compressed, which means that the shoulder of the locking tongues can not catch behind the annular stop. The seals of the quick coupling and the spring force in the different parts provide that the different parts may be rather fixedly inserted into each other, but when the hydraulic pressure is applied to the coupling the parts will be urged apart, with all the consequences caused by a "burst" hydraulic conduit under high pressure.

The manufacture of these quick couplings is rather complicated and requires high-tensile steel and very fine tolerances, at least in the male part, as the tongues alone must absorb the entire hydraulic pressure load. The tongues can neither be to coarse, as the interconnection shall be carried out manually without bigger efforts.

From U.S. Pat. No. 3,887,222 is known a quick coupling of similar type as that described above, but wherein the locking member is a slotted, resilient locking ring, which is positioned in a groove turned out in the male part. The locking ring can be brought to cooperate with an axially movable disengagement member inside the sleeve-shaped female part, which at the disengagement of the parts exerts a radial pressure on the slotted locking ring, thus that this is compressed and slides under the annular disengagement member. A radial compression of an axially slotted locking ring, which shall be able to absorb considerable compressive stresses axially, via a chamfered end edge requires big force, which makes the coupling considered as very stiff. Also this design suffers from the same drawback as that described above, i.e. that at interconnection of the male and female parts the locking ring may get stuck on the disengagement member, which prevents the locking ring from expanding, thus that no locking of the parts relative to each other is obtained.

A quick coupling intended for domestic use, e.g. as a quick coupling for garden hoses is known from U.S. Pat. No. 3,731,955, and which is equipped with a combined locking and sealing ring of rubber or plastic material having a V- or U-shaped cross-section. The coupling is designed for low pressures, as one inner shank 9 of the cross-sectionally V-shaped locking and sealing ring shall be able to absorb the axial pressure stresses of the coupling. This design is not useful in hydraulic applications where pressures of over 200 bars occur. On one hand the inner shank of the locking ring will be exerted to so big shear forces that the inner shank will be cut off, on the other hand the risk for permanent deformations in the inner shank are so big, that it will become very difficult to disengage the parts. As the locking ring also shall have a sealing function and it shall be possible to position it in the annular recess in the female part, it must be of rather soft material, which in turn means that the sealing and locking ring rather easily may fall out off the recess, when the parts are not interconnected. Disregarded from the sealing function it should of course be possible to design the V-shaped locking ring from a harder material, e.g. spring steel, but it is then in practice impossible to compress it manually, when the parts shall be pushed together.

PURPOSE AND MOST ESSENTIAL FEATURES OF THE INVENTION

The purpose of the present invention is to provide a quick coupling, which at interconnection of the parts always releases the locking member, which prevents that the parts may be pulled apart even if very high hydraulic pressures act upon the coupling. Another purpose is to improve the design considerably, without waiving the safety, the ease of handling, the medium flow and the service life. This has been obtained in that the locking member is constituted by an axially slotted or alternatively axially split, circular ring of spring steel or the like, that the ring incorporates a number of resilient tongues projecting from a cylindrical portion under inclination against the inner of the female part, and adapted to cooperate with said locking lip, and that the disengagement member is a ring, which is pushable over the collar-provided end portion of the male part, the side of said ring facing the reduced portion being designed with a resilient collar, the axial length of which is smaller than the cylindrical portion from which the tongues project.

DESCRIPTION OF THE DRAWINGS

The invention hereinafter will be further described with reference to the accompanying drawings, which show an embodiment.

DESCRIPTION OF EMBODIMENT

Figure 1:
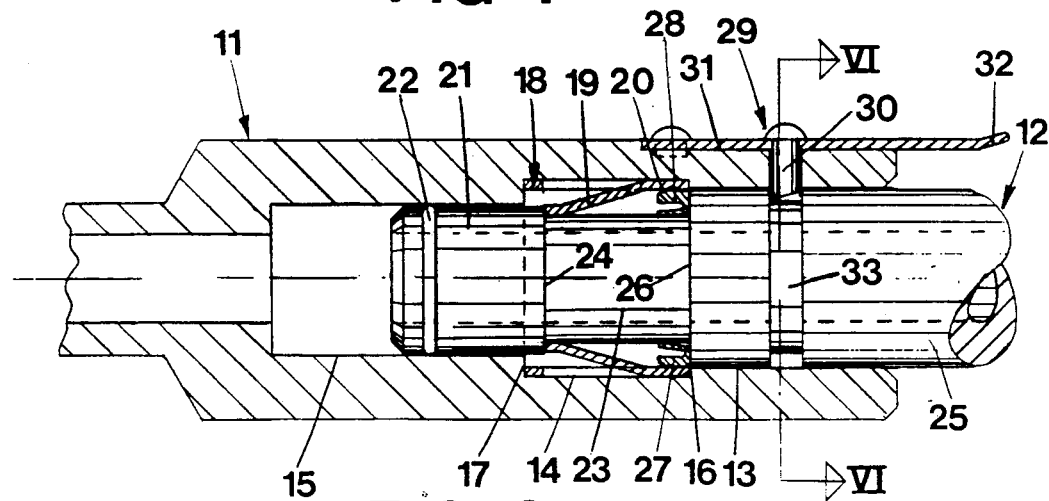
FIG. 1 shows a section through a quick coupling according to the invention with the coupling parts in interconnected position.

The quick coupling according to the invention comprises a sleeve-shaped female part 11 and a male part 12 insertable therein, each of which parts being fixedly fitted with a hose end (not shown). The inner circular space in the female part 11 is subdivided into three sections, a first outer one, designated 13, a second one 14 being concentric with or somewhat wider than the first section and an interior, third, also concentrically arranged section 15 with smaller diameter than the outer section 12. The transitory portions between the sections 13 and 14 are constituted by a first collar 16 and between the sections 14 and 15 of a second collar 17. In the deepest section 14 is positioned a locking member 18, e.g. consisting of an axially slotted ring of spring steel, in which is punched out a number of tongues 19, e.g. 4 tongues, which in unactuated position are bent radially obliquely inwards so much, that the tip of the tongue is situated below the collar 17. In order to be able to insert the locking member 18 in the circular recess 14, the annular locking member is axially slotted, thus that the ring can be compressed, whereby the end edges overlap each other, and the ring thus compressed can be inserted through the insert opening of the female part, i.e. the section 13. The tongue 19 continues in the locking member in an annular section 20, which with its end edge rests against the collar 16, whereas the opposite end edge of the locking member engages the collar 17.

The male part 12 of the quick coupling is designed with an external end portion 21 provided with sealing means 22 and fitting in the internal section 15 of the female part 11. A coaxial turned down portion 23 connects to the portion 21, thereby forming a circular collar 24. The length of the portion 23 corresponds mainly to the total length of the tongue 19 and the portion 20. The male portion 12 continues after the section 23 in a likewise coaxial portion 25 with bigger diameter than the portions 23 and 21 and substantially corresponding to the diameter of the section 13 of the female part 11.

On and along the reduced portion 23 of the male part 12 is provided an axially displaceable disengagement member 27, in the form of a ring, which has a height substantially corresponding to the depth of the collar 26, and an axial length, which is somewhat shorter than the length of the portion 20 of the locking member 18. The annular disengagement member 27 can be a closed ring of an appropriate plastic material reinforced with a resilient collar 28, which makes it possible to push the ring over the front end portion 21 of the male portion 12. However, the disengagement member 27 can also be split in two or more parts and be designed thus that the parts after assembly around the portion 23 can be detachably or permanently connected to each other.

In order to prevent the male part 12 from being pushed in too far in the female part to disengagement position, the female part 11 has been equipped with a stop device 29, which incorporates a blocking member 30 fixedly attached to a leaf spring 31, the extension 32 of which also provides a handle by means of which the blocking member 30 can be lifted out of engagement with a circumferential groove 33 in the male part 12. The blocking member 30 is preferably at its end cooperating with the groove 33 chamfered thus that the blocking member 30, when the male part 12 is pushed into the female part, is lifted against the action of the spring 31, until the male part has been pushed so far that the blocking member snaps into the groove 33. The stop device may of course be given a plurality of different designs, it may e.g. be arranged on the male part and cooperate with the end edge of the female part and which can be swung away when the male part shall be displaced to disconnecting position.

Figure 2:
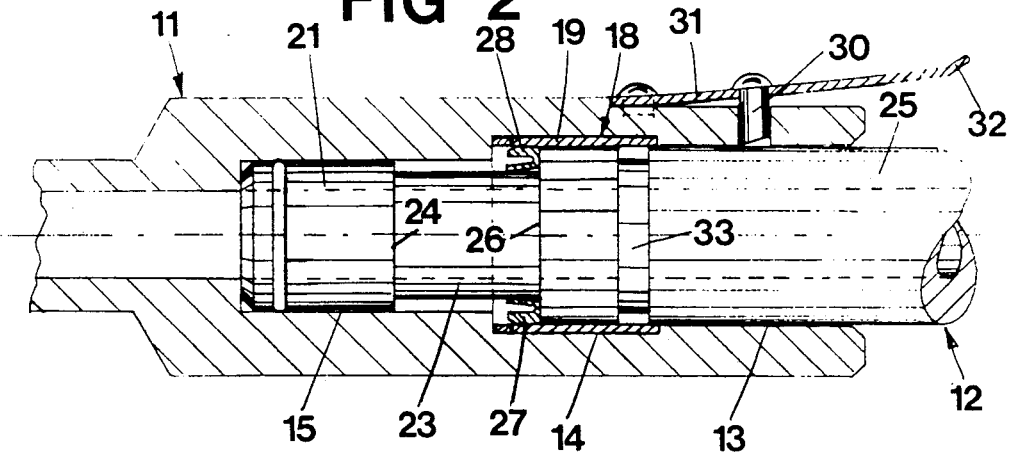
FIG. 2 shows a section of the quick coupling analogous with FIG. 1 with the male part in its pushed in disengagement position.

The particular design of the locking member 18 makes it possible to snap it into the recess 14, where the locking member in the position shown in FIG. 2 requires very small space, whereby the design may be manufactured in a very compact manner. As the locking member 18 is axially slotted it may on one hand be compressed when positioned in the recess 14 and due to its radial spring force, is, on the other hand, obtained an efficient clamping in the recess thus that the locking member can not be lost when the coupling parts are disconnected. The same applies to the disengagement member 27, which is provided with a resilient collar, which causes the disengagement member to be applicable over the end portion 21 of the male part, to obtain a good fit around the reduced portion 23 and to cause an engagement pressure against the locking member 18.

MODE OF OPERATION OF THE INVENTION

When inserting the male part 12 into the female part 11 the forward end portion 21 of the male part will lift the tongues 19 of the locking member 18 until the portion 21 has passed the tongues and these may spring back behind the collar 24. During the pushing in also the blocking member 30 will be lifted due to the fact that the forward edge of the disengagement member 20 will engage the chamfered end surface of the blocking member. As the tongues snap in behind the collar the groove 33 also will be situated in front of the blocking member 30, which snaps into the groove and prevents a continued forward displacement of the male part 12.

Figure 3:
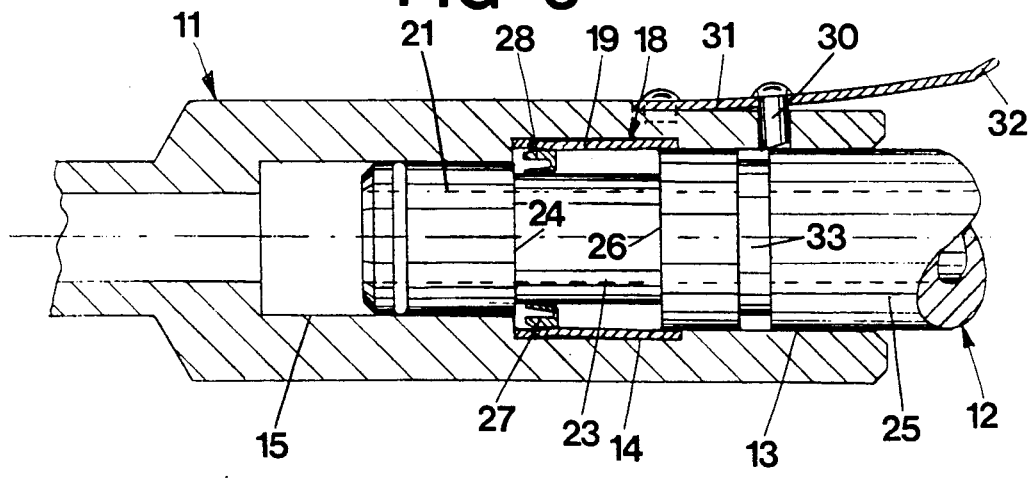
FIG. 3 and 4 show sections corresponding to FIG. 2 with the male part being pulled out to disengagement position.
Figure 4:
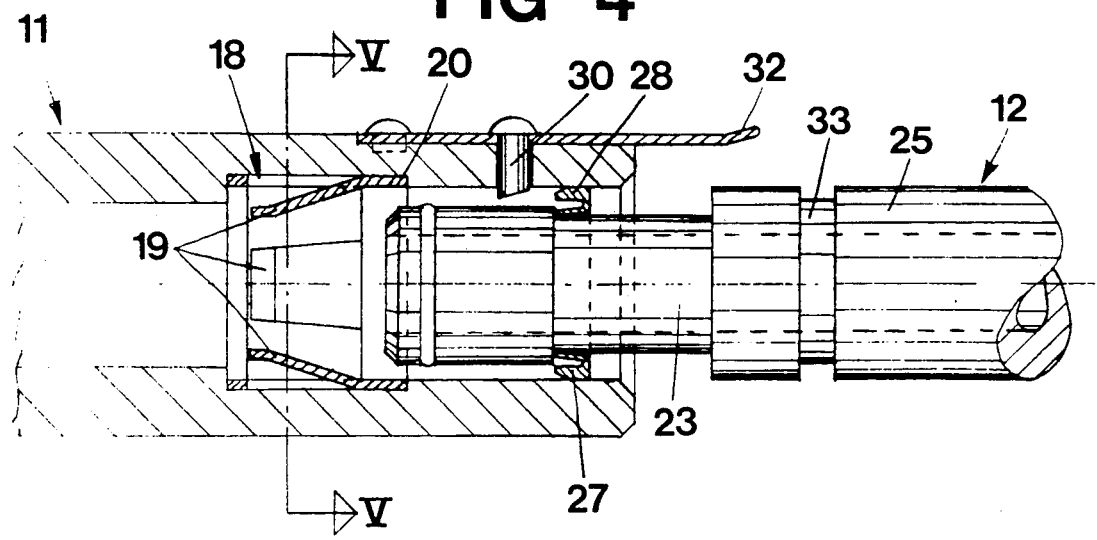
Figure 5:
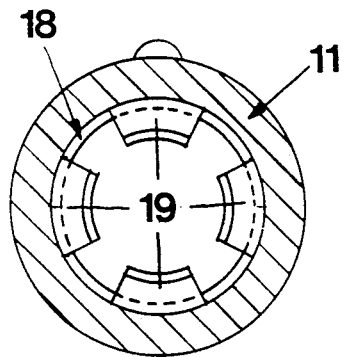
FIG. 5 shows a section along line V—V in FIG. 4.
Figure 6:
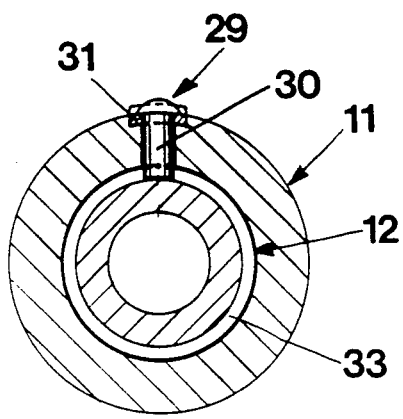
FIG. 6 shows a section along line VI—VI in FIG. 1.

At disengagement of the coupling the stop device 29 is first actuated by the blocking member being lifted in the handle 32 so much that the male part 12 may be pushed into the female part, whereby at the same time the disengagement member 27 lifts the tongues 19, such as shown in FIG. 2. If the male part 12 is now exerted to a pulling force the disengagement member 27, such as shown in FIG. 3, will remain in its pushed in position arrested by the spring force of the tongues 19, until the collar 24 abuts the disengagement member 27, which at a continued pulling-out movement of the male part carries along the disengagement member. In this position the collar edge 24 has passed the free ends of the tongues 19, which ends are slightly bent upwards, so that they without resistance may pass over the sealing member 22 of the male part. At a continued pulling-out of the male part the disengagement member 27 will accompany the male part out of the female part 11, such as shown in FIG. 4.

The invention is not limited to the embodiment shown, but a plurality of variants are possible within the scope of the claims.

What is claimed:

1. A quick coupling for liquid-proof interconnection of two high-pressure fluid conduits which comprises:
 a female part and a male part, the female part including a hollow sleeve having a recessed portion and the male part including first and second opposed end portions interconnected by a reduced portion, the interface between the first end portion and the reduced portion defining a first collar and the interface between the second end portion and the reduced portion defining a second collar, the male part having sealing means thereon for sealing engagement with said female part to provide said liquid-proof connection, and said male part being axially movable into and out of the female part;
 a locking member, the locking member including an axially split circular ring having a cylindrical portion disposed within the recessed portion of the sleeve and having a plurality of resilient tongues projecting radially inwardly to engage said second collar; and
 a disengagement member in the form of a ring disposed on the reduced portion and an axially extending third collar extending from the ring in a direction from the first end portion toward the second end portion, the axial length of the third collar being less than the axial length of the cylindrical portion of the locking member, the disengagement member being movable relative to the reduced portion and being engageable with the first collar when the male part is moved axially into the female part to engage and cause retraction of the resilient fingers from their radially projecting positions to substantially axial positions and being engageable with the second collar when the male part is axially moved out of the female part to disengage from and allow the resilient fingers to move back to their radially projecting positions.

2. A quick coupling as claimed in claim 1, including means for preventing the male part from moving into the female part beyond a predetermined position.

3. A quick coupling as claimed in claim 2, in which the preventing means comprises a circumferential groove formed in the first end portion of the male part and a locking member movably mounted on the female part so as to be radially movable into and out of the groove.

4. A quick coupling as claimed in claim 3, in which a leaf spring is provided for movably mounting the locking member to the female part.

* * * * *